United States Patent [19]

Miller

[11] Patent Number: 4,803,784
[45] Date of Patent: Feb. 14, 1989

[54] PORTABLE STAND FOR A SURVEYOR'S ROD

[76] Inventor: Donald P. Miller, 9239 S. 19th Ave., Phoenix, Ariz. 85041

[21] Appl. No.: 59,568

[22] Filed: Jun. 8, 1987

[51] Int. Cl.$^4$ .............................................. G01C 15/06
[52] U.S. Cl. ...................................................... 33/293
[58] Field of Search ........................................... 33/293

[56] References Cited

U.S. PATENT DOCUMENTS

| | | |
|---|---|---|
| 424,572 | 4/1890 | Painter .......................... 248/288.5 X |
| 522,391 | 7/1894 | Walker . |
| 1,194,772 | 8/1916 | Newman et al. . |
| 1,290,830 | 1/1919 | Fungo-Giera . |
| 1,934,223 | 11/1933 | Booth . |
| 2,260,995 | 10/1941 | Kruczek . |
| 2,580,350 | 12/1951 | Friedberg . |
| 2,731,863 | 1/1956 | Bellows .......................... 248/181 X |
| 2,775,423 | 12/1956 | Strass . |
| 2,788,578 | 4/1957 | Digiacinto . |
| 3,077,035 | 2/1963 | Hackney .......................... 33/293 |
| 3,685,162 | 8/1972 | Haun . |
| 3,730,470 | 5/1973 | Mitchell . |
| 3,911,589 | 10/1975 | Myeress . |
| 4,490,919 | 1/1985 | Feist et al. . |
| 4,527,339 | 7/1985 | Brunson . |
| 4,543,729 | 10/1985 | Holbrook . |

FOREIGN PATENT DOCUMENTS

| | | | |
|---|---|---|---|
| 58785 | 9/1891 | Fed. Rep. of Germany ........ 33/295 |
| 1067668 | 10/1959 | Fed. Rep. of Germany ... 248/288.5 |

Primary Examiner—Harry N. Haroian
Attorney, Agent, or Firm—Cahill, Sutton & Thomas

[57] ABSTRACT

A portable stand having a frictionally adjustable receiver for a surveyor's rod permits plumbing of the rod and maintains the rod vertical and stationary with respect to a point on the ground.

22 Claims, 2 Drawing Sheets

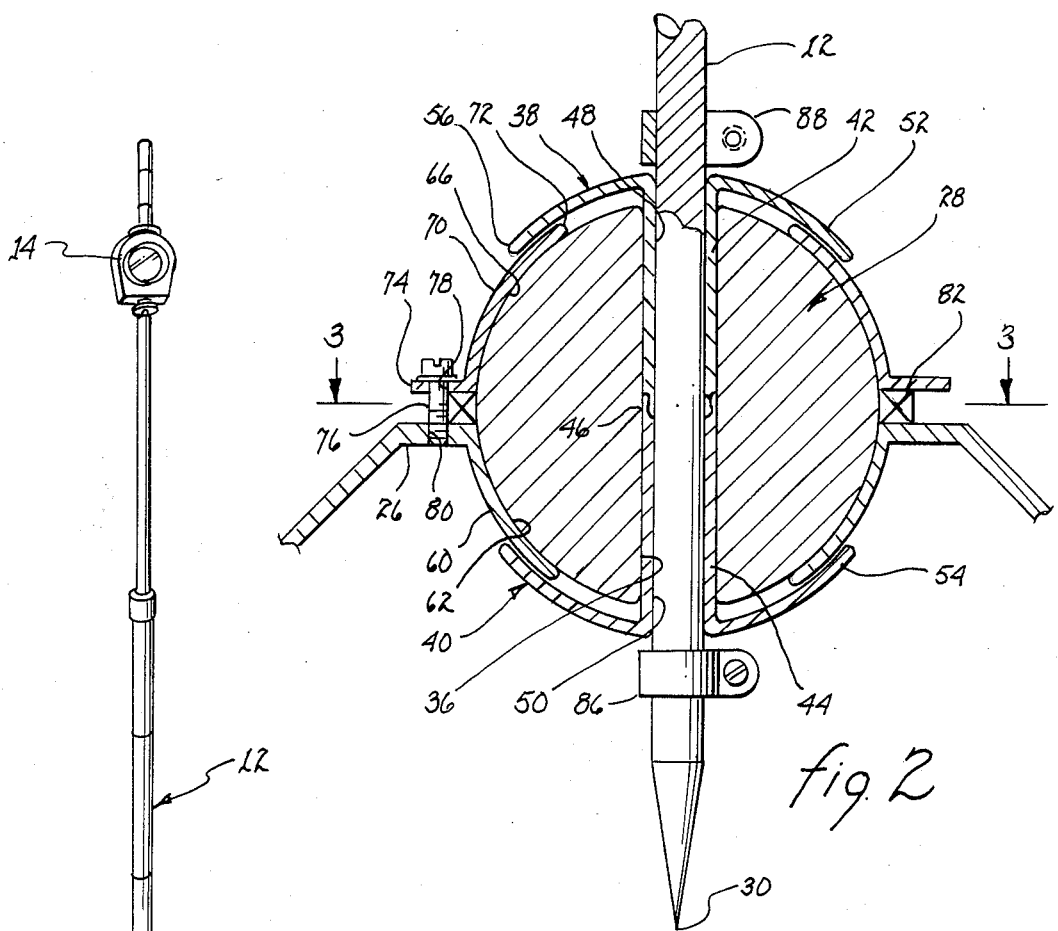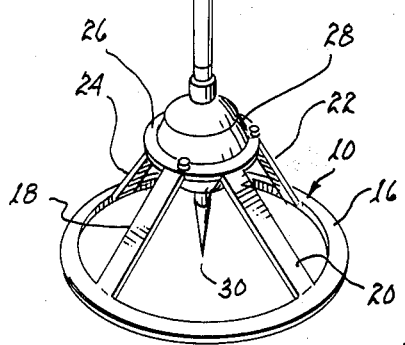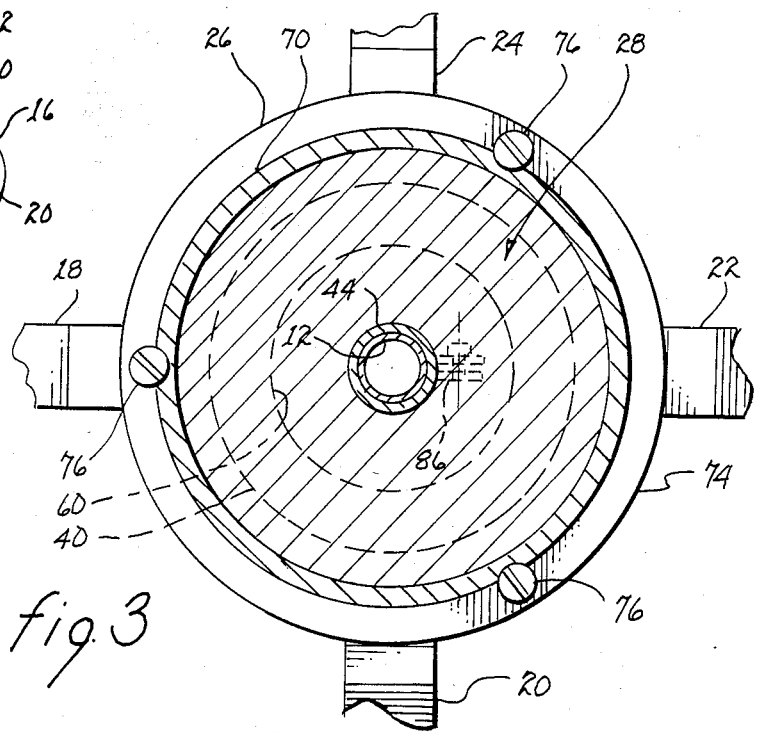

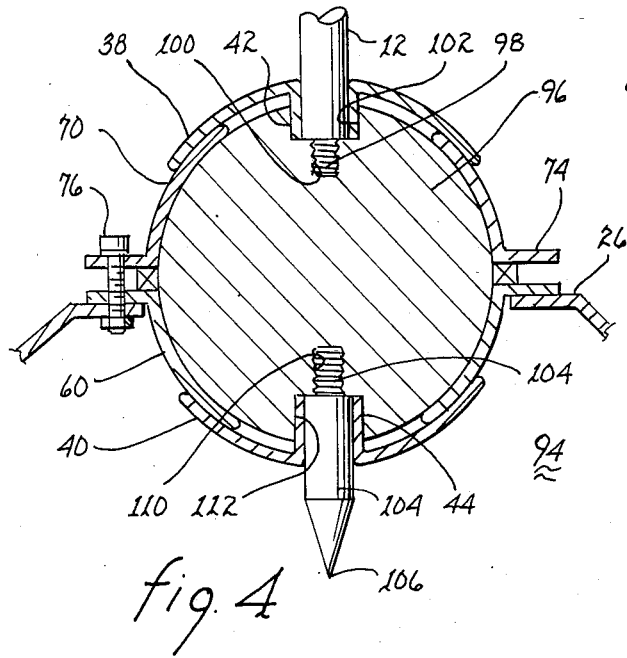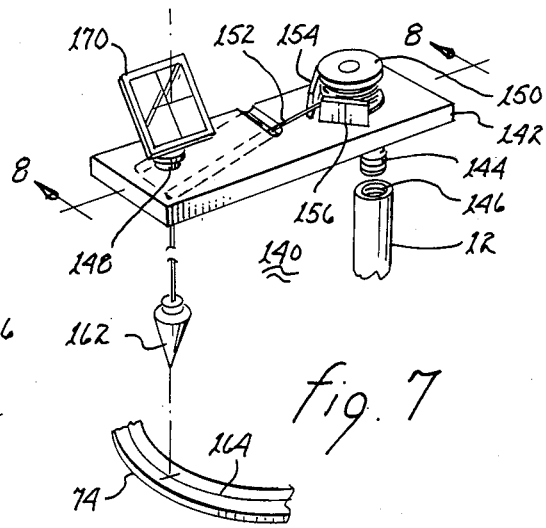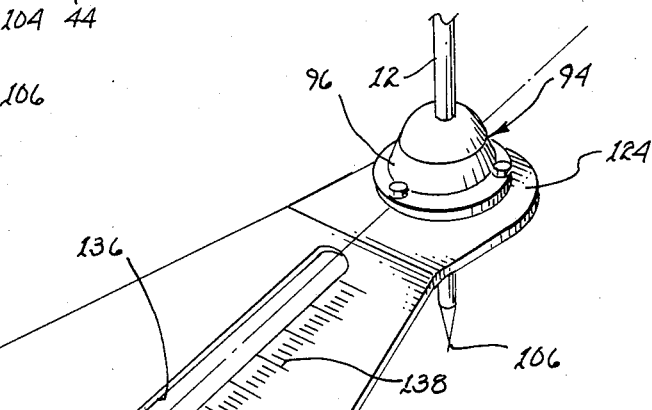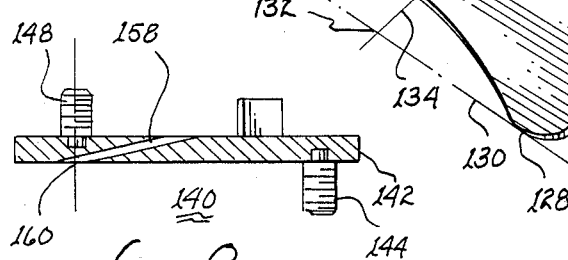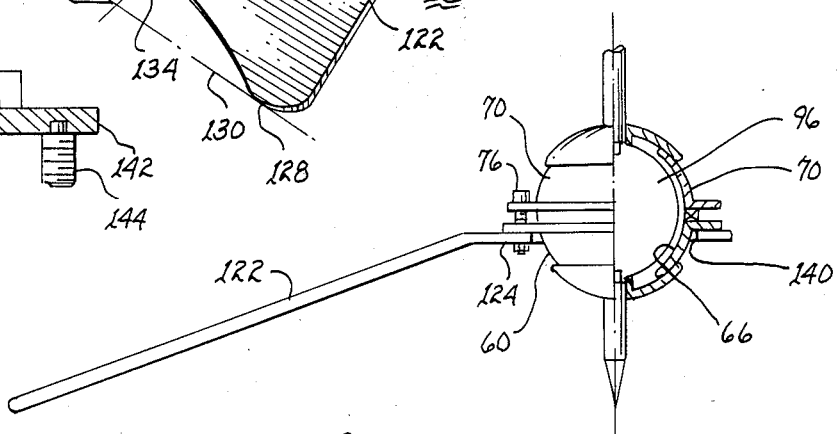

PORTABLE STAND FOR A SURVEYOR'S ROD

BACKGROUND OF THE INVENTION

1. Field of the Invention

The present invention relates to surveyor's tools and, more particularly, to stands for a surveyor's rod.

2. Description of the Prior Art

Traditionally, a surveyor has a rod man whose function it is to hold a rod precisely vertical at a specific location upon the ground. Unless the rod is maintained precisely vertical, errors will be introduced. Relatively modern surveying equipment includes the use of a prism or reflector upon the rod to reflect an emitted beam. Again, accuracy in maintaining the rod stationary and vertical during the taking of readings is of paramount importance. Sometimes, due to fatigue or difficult terrain, a rod man may have difficulty maintaining a rod immobile and vertical for a sufficient period of time to obtain an accurate reading, which reading may require 30 seconds to 5 minutes or more. Even the most conscientious rod man will inadvertently permit minor oscillations of the rod during a reading. Moreover, during a reading, the rod man is not available to attend to other matters nor is he free to rest.

One solution used in the field to maintain the rod steady and plumbed is that of using a tripod to support the rod. This solution is very effective and the time necessary to obtain the measurements are of no moment. However, it is time consuming to set up and plumb the tripod supported rod and it cannot be easily carried from place to place. Furthermore, certain terrain may preclude the use of a tripod due to the horizontal space required and the necessity for a footing for each of the tripod points.

Various other prior art surveyor's rod tools and devices are described in the following documents. U.S. Pat. No. 2,788,578 describes a support for a surveyor's staff, which support lockingly receives the staff. Three adjustable legs extend downwardly from the support, which legs can be adjusted to maintain the staff plumb. U.S. Pat. No. 3,685,162 is directed to a support apparatus for a rod which includes means for lockingly receiving the lower tip of the rod and a pair of legs having height adjustment means to permit repositioning the rod to vertical; a bubble attached to the support provides an indication of the degree of plumbness of the rod. U.S. Pat. No. 4,527,339 is directed to an optical target having a ball and cup support arrangement. Vertical positioning and maintenance in such position may be effected by two or more legs extending downwardly and laterally of a shaft portion of the target. U.S. Pat. No. 4,490,919 describes spikes connected to bases for supporting guides usable in elevational measurements through reflected beams. U.S. Pat. No. 3,911,589 is directed to a base having an adjustable horizontal frame for supporting a vertical rod within a vertical passageway; the adjustment for verticality includes a plurality of laterally extended threadedly engaged hand wheels.

SUMMARY OF THE PRESENT INVENTION

The present invention is directed to a self supporting portable stand for easily adjustably locating a surveyor's prism rod vertical over a point on the ground. The stand includes an annular band as a base from which a plurality of legs extend upwardly to support an annular diametrically oriented socket for a ball, which ball disengagably engages and supports the prism pole or the like. A variant stand also having a similar ball and socket provides a three point support with the tip of the pole serving as one of the three points. Adjustment means are provided to accommodate orientation of the ball within the socket and to frictionally maintain the ball located with respect to the socket to maintain the supported pole or rod vertical.

It is therefore a primary object of the present invention to provide a portable self supporting stand for maintaining vertical a surveyor's rod.

Another object of the present invention is to provide an easy to use accurate stand for a surveyor's rod.

Yet another object of the present invention is to provide a ball and socket mechanism for receiving and positionally maintaining a surveyor's rod.

Still another object of the present invention is to provide a stand for locating a surveyor's rod with respect to a point on the ground and for maintaining the rod vertical there above.

A further object of the present invention is to provide a positionally maintained but easily adjusted sphere for supporting a surveyor's rod.

A yet further object of the present invention is to provide a lightweight and field use compatible stand for a surveyor's rod.

A still further object of the present invention is to provide a sufficiently rigid stand for a ball and socket supporting a surveyor's rod.

A still further object of the present invention is to allow the rod man to perform other functions relative to his job while the surveyor is shooting the rod.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 is a perspective view of the present invention;

FIG. 2 is a partial cross-sectional view illustrating the positionally adjustable rod supporting mechanism;

FIG. 3 is a cross-sectional view taken along lines 3—3, as shown in FIG. 2;

FIG. 4 illustrates a variant of the ball illustrated in FIG. 2;

FIG. 5 is a perspective view illustrating use of the present invention in conjunction with variant stand having a scale;

FIG. 6 is a side view of the stand illustrated in FIG. 5;

FIG. 7 is a perspective view of an offset tool to verify vertically of an engaged rod; and FIG. 8 is a cross sectional view taken along lines 8—8, shown in FIG. 7.

DESCRIPTION OF THE INVENTION

Referring to FIG. 1, there is illustrated a stand 10 for supporting a surveyor's rod 12. As illustrated, the rod includes a prism 14. A reflector may be mounted on the rod or a standard surveyor's rod can also be supported by stand 10. The stand includes an annular band 16 which is placed upon the ground and serves as a base. A plurality of legs 18, 20, 22 and 24 extend upwardly and inwardly to support a ring 26. The ring adjustably supports a ball 28 to which rod 12 is attached, as illustrated.

The rod may extend through ball 28 to locate point 30 at a specified location on the ground.

Referring jointly to FIGS. 2 and 3, further details of ball 28 and it's adjustable interconnection with ring 26 will be described. A cylindrical passageway 36 extends diametrically through ball 28. An opposed pair of dust covers 38, 40 include sleeves 42, 44, respectively, extending into passageway 36 from opposed ends. These sleeves may be interconnected and retained in place by a snap fit junction 46. The cylindrical interior surface 48, 50 of sleeves 40, 44 respectively, support rod 12 located therein. Dust cover 38 includes a spherically configured cap 52 extending laterally from sleeve 42 in a curved parallel relationship with ball 28. Similarly, a spherically configured cap 54 extends laterally from sleeve 44 in curved parallel relationship will ball 28. The arc defined by the perimeter of each cap may be on the order of 120 degrees.

An annular support 60 depends from ring 26 to support, in curved parallel relationship, a lower part of ball 28. It may be noted that support 60 is overlapped by the perimeter of cap 54 of dust cover 40. Such overlap is maintained by appropriate dimensioning of the cap and the support 60 irrespective of any off vertical orientation of passageway 36 within predetermined limits. Typically, the overlap may define an arc of thirty degrees (30°) when passageway 36 is perpendicular to the plane of ring 26.

An annular band 70 extends upwardly from a point proximate ring 26 in curved parallel relationship with an upper part of ball 28. The upper part of band 70 is overlapped by cap 58. Upper end 72 of band 70 and perimeter 56 of the cap are dimensioned to maintain such overlap irrespective of any reorientation of passageway 36 within predetermined limits. Typically, the overlap may define an arc of thirty degrees (30°) when passageway 36 is perpendicular to the plane of ring 26.

Annular band 70 includes an outwardly extending flange 74. A plurality of threaded bolts 76 extend through corresponding apertures 78 in flange 74 for threaded engagement with threaded cavities 80 in ring 26. By tightening bolts 76, annular band 70 will be drawn downwardly toward ring 26. Such downward movement will act upon ball 26 to force it against inner surface 62 of support 60. Upon application of sufficient torque to threaded bolts 76, ball 26 will become frictionally retained in place adjacent surface 62 of support 60 and surface 66 of annular band 70. Preferably, the amount of friction exerted upon ball 26 is sufficient to preclude any unwanted rotational movement of the ball with respect to stand 10 while a shot is being taken. Yet, the movement of the ball relative to stand 10 should be possible without readjustment of the bolts to permit the rod man to realign the rod to vertical, if necessary, at a ground location by altering the angle of the rod through manual angular repositioning of the rod relative to the stand. A gasket 82 may be disposed intermediate ring 26 and flange 74 to prevent intrusion of foreign matter between ball 28 and support 60 and annular band 70.

As illustrated in FIG. 1, rod 12 is supported by point 30 resting upon the ground and ball 28 maintains, in conjunction with stand 10, the rod vertical. For the sake of convenience to a rod man in carrying the rod and stand from location to location, a collar 88 may be secured about rod 12 beneath dust cover 40. This collar precludes upward movement of the rod relative to ball 28 and permits the rod man to lift both the rod and stand by simply grasping the rod and lifting. To limit movement of the rod relative to the stand in the direction of point 30 during transport, a further collar 86 may be secured to the rod above dust cover 38. Further collar 86 may be used in any situation where it is of benefit to limit the extent of movement of rod 12 in the direction of point 30. The use of collar 88 only permits vertical reposition of rod 12 relative to stand 10 to accommodate, at different locations, any difference in elevation between the point on the ground at which a reading is to be taken and the elevation of band 16. This is effected by permitting rod 12 to slide downwardly to accommodate such terrain variations. By locating collar 88 close to point 30 upward movement of the rod relative to the stand can be accommodated for points on the ground higher than the elevational plane of band 16. As stated above, collar 86 is attached to rod 12 to permit transport of both the rod and stand by the rod man grasping and lifting the rod.

In operation, a rod man would locate stand 10 over a point on the ground at which a reading were to be taken. By using a bubble level, a plumb bob, or other leveling device adjacent or attached to rod 12, the rod can be plumbed to locate point 30 of the rod above the point on the ground. When the rod is plumbed, threaded bolts 76 are tightened to frictionally retain ball 28 with respect to the stand. The retention force exerted should be sufficient to positionally maintain the rod aligned in a vertical axis and yet permit manual realignment (if necessary) of the rod without further adjustment of balls 76 at a new location of the stand on the ground. After, manual alignment, the rod will remain vertical for as long as necessary to take a reading and the rod will remain immobile.

Referring to FIG. 4, there is illustrated a variant 94 of ball 28. Herein, rod 12 includes a threaded stud 98 at its lower end. To receive and engage such stud, ball 96 includes a threaded cavity 100. A cylindrical cavity 102 is formed in ball 96 concentric with threaded cavity 100 to receive a shortened sleeve 42 of dust cover 38. A rod tip 104 having a point 106 includes a threaded stud 108 in threaded engagement with thread cavity 110 in ball 96. A cylindrical cavity 112, concentrically aligned with threaded cavity 110, receives a shortened segment of sleeve 44 of dust cover 40. It may be noted that threaded cavities 100 and 110 are diametrically aligned. The industry standard thread for sections of rods/prism poles/range poles is a $\frac{5}{8} \times 11$ threads; cavities 100, 110 and stud 98,108 may be so threaded.

Under certain circumstances, and upon very flat and uniform surfaces, a variant stand 12 illustrated in FIGS. 5 and 6 may be useful. The variant stand includes a first rigid member 122, which may be slanted as shown, and a second member 124 for receivingly engaging a ball, such as ball variant 94. First member 122 includes a pair of feet 126, 128 which, in combination, define a line 130. The feet are so located relative to one another that mid point 132 of line 130 therebetween is the intersection of a perpendicular line 134 extending through the vertical axis of ball 96. Furthermore, the first member includes a slot 136 centered upon line 134 of sufficient width to permit viewing of the ground beneath the first member. A plurality of graduations 138 of a scale are disposed along one or both sides of the slot. These graduations are a function of the distance to line 130 and/or to the vertical axis of ball 96. By use of a bubble, plumb bob or the like, to vertically align rod 12, the offset of point 106 of the rod can be readily read from graduations 138.

It may be noted that second member 124 is raised above the ground by an amount sufficient to permit ease of viewing the point of contact between point 106 and the ground.

Second member 124 includes an aperture 140 for receiving support 60 within which ball 96 is located. In the manner described with respect to FIG. 4, annular band 70 is secured to second member 124 by threaded bolts 76. The use of ball variant 96, as explained in detail with respect to FIG. 4, accommodates vertical positioning of rod 12. Furthermore, the three point support provided by point 106 and feet 126, 128 of variant stand 120 supports the rod erect in an essentially immobile relationship to the identified point on the ground.

It is to be understood that ball 28, and it's support and retention mechanisms attendant rod 12 may be substituted for ball 96 in variant stand 120. Moreover, as particularly illustrated in FIG. 4, collar 88 may be omitted since it is preferable to permit rod 12 to slidably descent until point 30 contacts the point of interest on the ground. Because of the undulating surface of the ground over which much of surveying is performed, point 30 will vary, vertically, with respect to the plane defined by band 16.

Referring jointly to FIGS. 7 and 8 there is illustrated an offset tool 140 which is usable in conjunction with a rod, range pole or prism pole to check the accuracy of a bubble level. Alternatively, the tool may be used in place of a bubble level when warranted under certain circumstances. The tool includes a platform 142 having a first threaded stud 144 extending downwardly therefrom. The stud is configured to threadedly engage the upper end of a section of a rod 12 having a threaded cavity 146 disposed therein. A further threaded stud 148 extends upwardly from platform 142 a specified distance from the center line of threaded stud 144 and parallel therewith. A target, reflector 170, or other device to be sighted by the surveyor, is mounted upon stud 148.

A reel 150 supporting a cord 152 may be attached to or rest upon board 142. Fences 154, 156 may be incorporated with platform 142 to retain reel 150 in place and yet permit cord 152 to pass therebetween, as illustrated. A slot 158 extends through platform 142 to serve as a conduit or passageway for cord 152. Lower end 160, representing the exit point for the cord, is in alignment with the vertical axis extending through threaded stud 148. A plum bob 162 is attached to the end of the cord.

As indicated representatively in FIG. 7, ring 126, flange 74 of stand 10 or second member 124 of variant stand 120 may include a scribed line 164. The scribed line may be a circular line having a radius equivalent to the distance between the vertical axis of threaded studs 144 and 148 and centered upon the vertical axis of the respective stand supported ball; inherently, the circular line is centered upon the axis of rod 12.

In operation, the verticality of rod 12 can be checked using offset tool 140 by positioning the rod, via repositioning of ball 28 (96), such that in one axis, cord 152, depending from the offset tool is superimposed upon the center line of rod 12 and therefore is parallel with the rod. Movement of the rod in an orthogonal axis is then effected to locate the point of plumb bob 162 coincident with line 164. With such alignment in two axis, the rod will be vertical. Such verticality can be used to check the accuracy of a bubble level normally used.

Since the distance between the vertical axis of threaded stud 144 and threaded stud 148 is known, the offset of reflector 170 with respect to the point of rod 12 upon the ground is known and the computations can be appropriately modified by the surveyor.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A portable stand for a surveyor's rod, said stand comprising in combination:
   (a) a base;
   (b) means for engaging the surveyor's rod, said engaging means including at least a partial spherical surface having an upper part and a lower part;
   (c) means for attaching said engaging means to said base;
   (d) said attaching means including a lower annular band having an upper and a lower edge for receiving said lower part of said spherical surface, an upper annular band having an upper and a lower edge for receiving and said upper part of said spherical surface and means for interconnecting said base with one of said lower annular band and said upper annular band; and
   (e) said attaching means including means for frictionally restraining movement of said engaging means relative to said base, said restraining means including means for urging said upper annular band and said lower annular band toward one another, said urging means including means associated with said lower edge of said upper annular band and with said upper edge of said lower annular band for drawing said upper annular band and said lower annular band toward one another;

whereby, the surveyor's rod is maintained immobile relative to said stand.

2. The portable stand as set forth in claim 1 wherein said engaging means comprises a ball.

3. The portable stand as set forth in claim 2 including means for limiting upward movement of the rod relative to said ball to permit transport of said portable stand and the surveyor's rod upon lifting of the surveyor's rod.

4. A portable stand for a surveyor's rod, said stand comprising in combination:
   (a) a base;
   (b) a ball for engaging the surveyor's rod;
   (c) means for aligning the rod with a diameter of said ball, said aligning means including a passageway extending through said ball for penetrably receiving the rod;
   (d) means for limiting upward movement of the rod relative to said ball;
   (e) means for attaching said ball to said base; and
   (f) said attaching means including clamping means for frictionally restraining movement of said ball relative to said base, said clamping means including a support for supporting a lower part of said ball, an annular band for circumscribing an upper part of said ball, means for drawing said annular band toward said support to frictionally retain said ball therebetween and an upper dust cover extending from said passageway downwardly in overlapping relationship with said annular band; whereby, the surveyor's rod is maintained immobile relative to said stand.

5. The portable stand as set forth in claim 4 further including a lower dust cover extending from said passageway upwardly in overlapping relationship with said support.

6. The portable stand as set forth in claim 1 wherein said engaging means means includes a first cavity for receiving and retaining the lower end of the rod and a second cavity diametrically aligned with said first cavity for receiving and retaining a rod section having a pointed tip.

7. The portable stand as set forth in claim 6 including an upper dust cover extending from said first cavity downwardly in overlapping relationship with upper annular band.

8. The portable stand as set forth in claim 7 further including a lower dust cover extending from said second cavity upwardly in overlapping relationship with said lower annular band.

9. The portable stand as set forth in claim 2 wherein said base includes at least three legs and wherein said interconnecting means interconnects said legs.

10. The portable stand as set forth in claim 9 wherein said interconnecting means includes a ring for circumscribing said ball.

11. The portable stand as set forth in claim 10 wherein said lower annular band extends downwardly from said ring for supporting said ball.

12. The portable stand as set forth in claim 1 wherein said base includes a pair of feet for contacting the ground and wherein a third point of support is provided by an extension of the surveyor's rod depending from said engaging means.

13. The portable stand as set forth in claim 12 wherein said base includes a first member supporting said feet and a second member and wherein said second member includes said attaching means.

14. The portable stand as set forth in claim 13 wherein said engaging means includes a passageway extending through said ball for penetrably receiving the surveyor's rod.

15. The portable stand as set forth in claim 14 further including an upper dust cover extending from said passageway downwardly in overlapping relationship with said upper annular band.

16. The portable stand as set forth in claim 15 further including a lower dust cover extending from said passageway upwardly in overlapping relationship with said lower annular band.

17. The portable stand as set forth in claim 13 wherein said first member includes a slot having a scale disposed therealong in radial alignment with said engaging means.

18. The portable stand as set forth in claim 17 wherein said first member is angled relative to said second member.

19. A portable stand for a surveyor's rod, said stand comprising in combination:
(a) a base;
(b) means for engaging the surveyor's rod;
(c) means for attaching said engaging means to said base;
(d) said attaching means including means for frictionally restraining movement of said engaging means relative to said base;
(e) an offset tool for plumbing the rod, said tool comprising a platform having a first downwardly directed means having a vertical axis for supporting said platform upon the rod and a second upwardly directed means having a vertical axis and a cord supported plumb bob extending from said platform coincident with the vertical axis said second supporting means, said stand including a line defining a locus of points equidistant from the axis of the rod engaged by said engaging means by a distance equivalent to the distance between the vertical axis of said first and second supporting means.

20. An offset tool for use with a surveyor's rod to align longitudinal axis of the rod in the vertical axis, said offset tool comprising in combination:
(a) a platform;
(b) means for securing the platform to the rod;
(c) a target to be sighted by a surveyor;
(d) a cord terminated by a plumb bob extending from said platform a known lateral distance from the longitudinal axis of the rod said target being disposed along said platform the known distance from the longitudinal axis of the rod and is in vertical alignment with the point of extension of said cord; and
(f) means disposed beneath said platform for indicating a distance equivalent to the known distance; whereby, orienting the rod to align said cord with the longitudinal axis of the rod in one plane and to align the plumb bob with said indicating means orients the rod vertically.

21. The offset tool as set forth in claim 20 wherein said target is a reflector.

22. The offset tool as set forth in claim 20 wherein said platform includes a rotatably mounted reel about which said cord may be wound and a slot through which said cord passes from said reel to the point of extension of the cord.

* * * * *